UNITED STATES PATENT OFFICE.

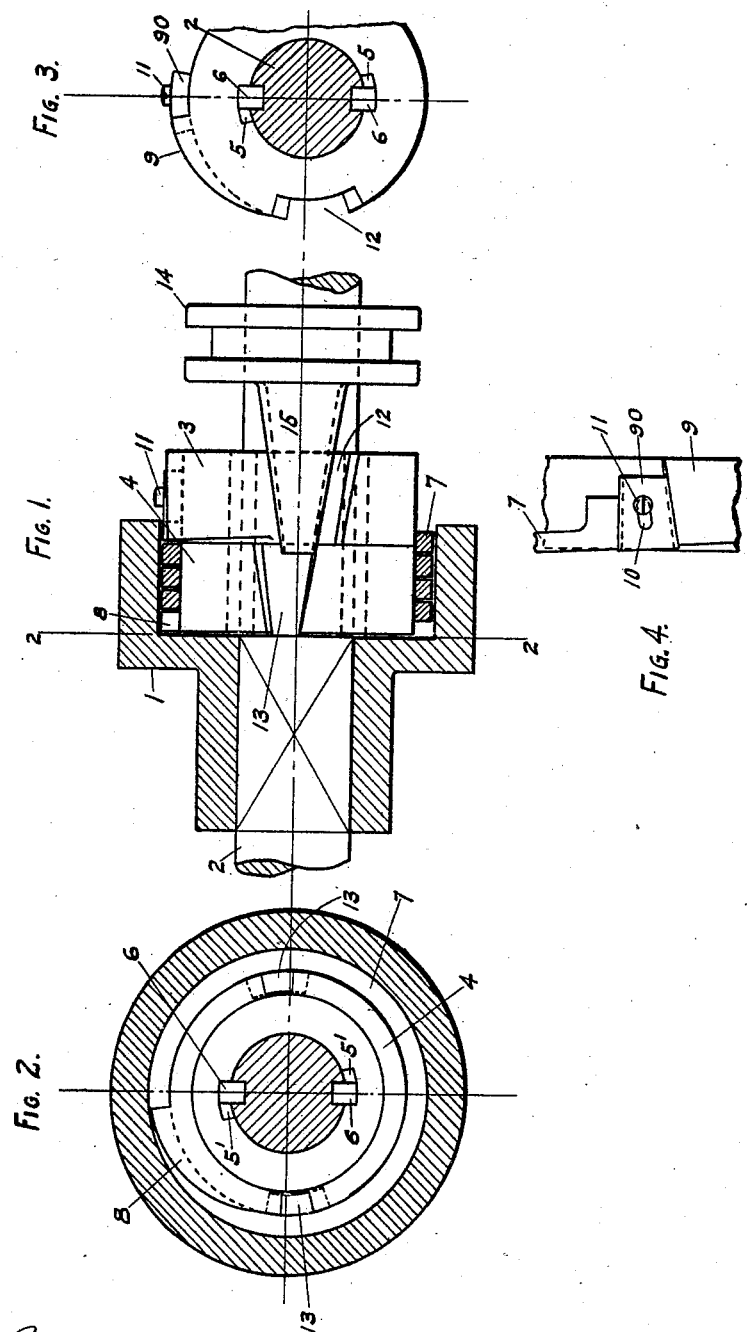

VICTOR R. BROWNING, OF LAKEWOOD, OHIO.

FRICTION-CLUTCH.

SPECIFICATION forming part of Letters Patent No. 683,169, dated September 24, 1901.

Application filed January 7, 1901. Serial No. 42,413. (No model.)

*To all whom it may concern:*

Be it known that I, VICTOR R. BROWNING, a citizen of the United States, residing at Lakewood, in the county of Cuyahoga and State of Ohio, have invented a new and useful Improvement in Friction-Clutches, of which the following is a specification.

This invention relates to friction-clutches, and has for its objects the production of a clutch which will be cheap in its manufacture and quick, simple, and positive in its operation. These objects I accomplish by means of the structure which is illustrated in the accompanying drawings, in which—

Figure 1 shows a view, partly in section and partly in elevation, of the clutch. Fig. 2 is a sectional view through the clutch on the line 2 2 of Fig. 1 looking to the right. Fig. 3 is a view of the clutch as seen from the right-hand end of Fig. 1, the wedge and its sleeve being omitted; and Fig. 4 shows a means for adjusting the clutch to take up lost motion caused by the wearing of the parts.

Similar reference characters designate corresponding parts throughout the several views.

As shown, this clutch is intended to drive a pulley 1, which is loosely mounted on shaft 2. Keyed to this shaft and turning with the same are two disks 3 and 4, which are mounted side by side, the disk 4 being entirely within the rim of the pulley 1. The disk 3 is of the same diameter as disk 4 and preferably extends part way beneath the flange of the pulley 1. While these disks are keyed to the shaft 2 and turn therewith, they are at the same time allowed a slight amount of play or lost motion about the same for a purpose hereinafter explained. This lost motion is secured by making keyways 5 and 5' in the disks larger than the keys 6, which enter the same. These keys 6 are arranged on diametrically opposite sides of the shaft 2 and extend along the shaft through both of the disks 3 and 4.

Closely fitting the outer surface of the disk 4 and lying between that disk and the flange of the pulley 1 is a helical spring 7. This spring is not secured at any point to either of the disks 3 or 4, but has its ends bearing against projections on said disks, so that when the disks are rotated slightly in opposite directions on the shaft 2 the projections will bear against the ends of the spring and cause the same to expand into engagement with the inner surface of the flange of the pulley 1. The lug or projection on the disk 4 is indicated in Fig. 2 at 8, and the spring 7 is shown abutting against the squared face of this lug. The lug on the disk 3 for coöperating with the opposite end of the spring is shown in Fig. 4 at 9. Mounted adjustably upon this lug is an adjusting-wedge 90, which has a slot 10, through which projects a set-screw 11 for securing the same to the disk. It will be seen that the contacting surfaces of the wedge and disk are inclined, so that by loosening the screw 11 and sliding the wedge to the right the same will be moved forward toward the end of the spring. In this manner all wear which may have resulted is taken up. It will be understood that the wedge 90 faces in the opposite direction from the lug 8 on the other disk.

Arranged on diametrically opposite sides of the disk 3 are depressions 12, which have their bottom surfaces concentric with the shaft 2 and have their side walls tapering toward a point for a purpose hereinafter stated. The disk 4 also has these diametrically and otherwise similarly arranged depressions, which are normally out of line with the depressions on the disk 3. These depressions are shown at 13.

Mounted upon the shaft 2, so as to slide thereon and also to turn therewith, is a collar 14 for the shifting yoke, which is not shown. Projecting from this collar on diametrically opposite sides are wedge-fingers 15, which extend into the depressions 12 of the disk 3 and for a slight distance into the depressions 13 of the disk 4. By having these fingers arranged on each side of the shaft the weight is equally balanced, so that smooth running is obtained, and the strain which would result from having the thrust all come on one side of the clutch is obviated. As shown in Fig. 1, the wedge-fingers are withdrawn from the depressions in the disks 3 and 4 to their fullest extent, and when in this position the disks are forced by the spring with their depressions out of line with each other, the spring closely hugging the disk 4. When, however, the wedge-fingers are thrust inwardly, the disks are each rotated in a direction such as to bring their depressions into line with each other. This results in causing the lug 8 and the wedge 90 to force forward the ends of the helical spring, which causes it to partially uncoil and to expand into frictional driving contact with the inner surface of the flange of the pulley 1. By special reference to Fig. 2 it will be seen that when the disk 4 is turned to the right upon its shaft it causes the lug 8 on the disk to push forward the end of the spring abutting the same, which expands the spring into engagement with the inner surface of the flange of the pulley. The load now being thrown upon the disk 4 the key 6 will move to the forward face of the key-seat 5', which positively connects the disk 4 with the shaft and causes the lug 8 to continue to push forward on the spring, the tendency of the latter being to move toward the lug 8 and away from wedge 90. It will be seen, therefore, that the disk 3 has no work to perform while the shaft is moving in this direction, and it is driven not by its key 6, but by the disk 4 through the wedge-fingers 15. When, however, the direction of rotation of the shaft 2 is reversed, the disk 3 becomes the driving member, and the loose connection between the disk 4 and its shaft permits practically all of the strain to be removed therefrom. The two disks therefore alternate in doing the driving, the particular disk doing the work being governed by the direction of rotation of the shaft 2. By having the spring closely hugged to the disk 4 when the clutch is out of gear the shaft 2, the disks, and the spring may be rotated at any speed and there will be no noise or rattle of loose parts.

While this clutch is shown driving a pulley, it may of course be employed for driving any sort of device which may be mounted upon the shaft, or it may be mounted upon another shaft in line therewith. It will also be understood that the details of construction—such, for example, as the means for taking up the wear of the spring—may be changed without departing from the spirit of my invention.

Having thus described my invention, what I claim as new, and desire to secure by Letters Patent, is—

1. In a friction-clutch a shaft, a driven member mounted loosely on the shaft, two driving members loosely keyed on said shaft and turning with the same, a spring within the driven member having its ends abutting the driving members, and means for moving said driving members with reference to each other to cause them to expand the spring into frictional engagement with the driven member.

2. In a frictional clutch a driven member, driving members mounted in axial alinement therewith, a spring within a portion of said driven member having its ends abutting the driving members, and means for causing said driving members to expand the spring to cause it to engage frictionally with the driven member.

3. In a reversible friction-clutch, a driven member, a friction device for engaging and turning the same, two driving members for driving the friction device, and means whereby a change in direction of rotation of the driving members results in changing the load from one driving member to the other.

4. In a friction-clutch a driven member, a shaft, a pair of disks keyed loosely on said shaft and in axial alinement with the driven member, a spring having its ends engaging the disks, and means for rotating the disks relatively to each other to cause the spring to enter into driving engagement with the driven member.

5. In a reversible friction-clutch, a driven member, a spring for frictionally engaging and turning the same, driving members engaging each end of the spring to drive the same, and means whereby a change in rotation of the driving members results in throwing the load from one driving member to the other.

6. In a reversible friction-clutch, a shaft, a driven member mounted loosely on said shaft, a pair of driving disks or collars loosely connected with said shaft, a coiled spring within the driven member and closely hugging the driving-disks, the ends of the spring abutting the disks, and means to move the disks relatively to each other to expand the spring into engagement with the driven member.

7. In the reversible friction-clutch, a driven member, a shaft, a pair of driving members loosely keyed to said shaft, a spring within the driven member having its ends abutting the driving members, and means for rotating the disks in opposite directions to expand the spring into engagement with the driven member.

8. In a friction-clutch a driven member, a spring for driving said member, and disks for driving said spring, a lug on one of said disks provided with an inclined face, a slotted wedge on said lug abutting one end of the spring, and a set-screw passing through the slot and securing the wedge to the lug.

9. In a friction-clutch a driven member, a driving-spring within said driven member, a shaft, a pair of disks or collars keyed to said shaft, the key-seats in the disks being larger than the coöperating keys, lugs on the disks abutting the ends of the spring, a sliding yoke-collar on the shaft provided with a plurality of wedge-fingers, depressions in the disks normally out of line with one another, but which are forced into line when the wedge-fingers are pushed inwardly, thus rotating the disks in opposite directions to expand the spring into driving contact with the driven member.

In testimony whereof I affix my signature in the presence of two witnesses.

VICTOR R. BROWNING.

Witnesses:
E. G. DEUCHER,
EARL H. BROWNING.